US008151636B2

(12) United States Patent
Siraky

(10) Patent No.: US 8,151,636 B2
(45) Date of Patent: Apr. 10, 2012

(54) DEVICE FOR MEASURING THE AXIAL POSITION OF A PISTON ROD RELATIVE TO A CYLINDER HOUSING

(75) Inventor: Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 159 days.

(21) Appl. No.: 12/659,011

(22) Filed: Feb. 23, 2010

(65) Prior Publication Data

US 2010/0223982 A1 Sep. 9, 2010

(30) Foreign Application Priority Data

Mar. 6, 2009 (EP) .................................... 09003286

(51) Int. Cl.
*G01M 15/06* (2006.01)

(52) U.S. Cl. .................................................... 73/114.28

(58) Field of Classification Search ................ 73/114.28
See application file for complete search history.

(56) References Cited

U.S. PATENT DOCUMENTS

| | | | | |
|---|---|---|---|---|
| 4,543,649 | A * | 9/1985 | Head et al. | 367/96 |
| 5,450,009 | A * | 9/1995 | Murakami | 324/207.21 |
| 5,461,311 | A | 10/1995 | Nakazato et al. | |
| 6,393,963 | B1 * | 5/2002 | Kadlicko | 92/5 R |
| 7,367,257 | B2 * | 5/2008 | Kadlicko | 92/5 R |
| 7,493,995 | B2 * | 2/2009 | Sas et al. | 188/267 |
| 2005/0274254 | A1 * | 12/2005 | Kadlicko | 92/5 R |
| 2006/0011426 | A1 * | 1/2006 | Sas et al. | 188/266.1 |

FOREIGN PATENT DOCUMENTS

| | | | | |
|---|---|---|---|---|
| DE | 198 01 091 | A1 | | 8/1998 |
| DE | 100 10 042 | A1 | | 7/2001 |
| EP | 0108 949 | A1 | | 5/1984 |
| EP | 1 721 087 | B1 | | 11/2006 |
| WO | WO 2005088154 | A1 | * | 9/2005 |

* cited by examiner

*Primary Examiner* — Freddie Kirkland, III
(74) *Attorney, Agent, or Firm* — The Nath Law Group; Jerald L. Meyer; Stanley N. Protigal

(57) ABSTRACT

Device for measuring the axial position of a piston rod (18) relative to the cylinder housing (10) of a cylinder-piston unit that is actuated by fluid pressure, with structures having elevations or indentations formed in the jacket surface of the piston (18), which elevations or indentations form an axially extending material measure; and with a sensor device (28), which is positioned on the cylinder housing and which scans the structure with sensors that are positioned in the axial direction for the purpose of contact-free positional sensing; and with an abrasion-proof cover by means of which the structure is guided within the cylinder housing (10), where the structures are annular structures (22, 24) that concentrically surround the piston rod (18), and where the cover is a tube (26) that is coaxially slid onto the piston rod (18), and where the annular structures (22, 24) form an absolutely coded material measure.

10 Claims, 2 Drawing Sheets

DEVICE FOR MEASURING THE AXIAL POSITION OF A PISTON ROD RELATIVE TO A CYLINDER HOUSING

The present disclosure relates to a device for measuring the axial position of a piston rod relative to the cylinder housing of a cylinder-piston unit that is actuated by fluid pressure, using structures that constitute elevations and depressions formed in the cover surface of the piston rod, in which the structures form a material measure that runs in the axial direction and that employs sensors that are spaced in the axial direction to scan the structure in a contact-free fashion the purpose of position identification, and with an abrasion-proof cover for the purpose of guiding the structure inside the cylinder housing.

For many applications involving cylinder-piston units actuated by fluid pressure, i.e., pneumatic or hydraulic units, it is necessary to measure the position of the piston rod relative to the cylinder housing, which as a rule is mounted in fixed position. Determining the position of the piston rod is necessary, e.g., when such units are installed as a servo-drive in the automated system, as is calculating magnitudes such as speed and acceleration that are dependent on the piston rod's position.

To measure the position of the piston rod it is known to design a piston rod with a material measure which runs in the axial direction and which is scanned by a sensor device positioned on the cylinder housing. It is known, e.g., from DE 100 20 764 A1 and DE 196 48 335 C2, to insert a permanent magnetic material measure into the casing or jacket of the piston rod or into the interior of the tubular piston rod. The insertion of this kind of permanent magnetic material measure is costly. Since the material measure is designed as a strip running in the axial direction, the piston rod must be guided in a way that ensures it against rotation.

Known from DE 198 01 091 A1 is a device of the initially described type. An axially running, strip-shaped material measure is incorporated into the jacket surface and consists of elevations projecting above the jacket surface or indentations that dip into this jacket surface. Two magnetic sensors that are spaced at a distance from each other in the axial direction scan this material measure. To guide the piston rod inside the cylinder housing in a sealed and slidable fashion, the material measure is covered with a chromium coating. It is expensive to incorporate the material measure into the piston rod. A further increase in manufacturing costs results from the fact that the material measure must be provided with a chromium coating, after which the jacket surface must be again trimmed to create a sealed channel within the cylinder housing. Here too the strip-shaped material measure necessitates a rotation-proof channel inside the cylinder housing. The material measure is scanned incrementally, so that at the beginning of the piston rod's movement, a reference position must first be crossed.

The disclosed device measures the axial position of a piston rod relative to a cylinder housing. The device has a robust design, is simple to produce, and can be employed in a versatile manner. The structures the constitute elevations and depressions formed in the cover surface are annular structures that enclose the piston rod concentrically. The abrasion-proof cover is a tube coaxially slid onto the piston rod, and the annular structures form an absolutely coded material measure In the disclosed device, the piston is designed to have a material measure which is formed by annular structures surrounding the piston rods horizontally, e.g., elevations or indentations. Since these annular structures surround the piston rod concentrically, the piston rod having these annular structures can be manufactured in a simple manner, particularly by turning or grinding. Due to the rotationally symmetrical design of the annular structure, the material measure can be scanned in every rotational position occupied by the piston, with the result that a non-rotating guidance channel for the piston rod is not necessary and the unit can be employed in a versatile fashion. To permit the piston rod to be guided in a sealed and axially movable fashion, a tube can be slid coaxially onto the piston rod to seal the material measure. The tube is made of an abrasion-proof material in order to minimize the frictional abrasion resulting from axial movement. The tube is radially supported by the outer circumference of the annular structures. Consequently the tube must not receive any radial forces and as a result can be designed so as to have a thin wall. Production of the tube is simple, and sliding the tube onto the piston consequently involves only a simple mounting process. The annular structures form an absolutely coded material measure with respect to position, so that the position of the piston rod is immediately available, even upon startup after an interruption in operation.

In one advantageous embodiment, the material measure of the piston rod is divided by equidistant annular measuring structures into periodic segments which follow each other in succession. Each of these segments is scanned in absolute fashion by the sensor device, with the result that the position of the piston within the given segment can be ascertained in absolute fashion. An annular assigning structure is also positioned inside of each segment. The axial position of this annular assigning structure within the given segment is different for each segment. The axial position of the annular assigning structure within the given segment is thus a clear indicator of the given segment and is able to clearly define the latter's position within the entire axial material measure. From this clear assignment of the segment and from the absolute positional measurement within the segment it is thus possible to obtain an absolute measurement of position over the piston rod's entire length of stroke. The accuracy of this positional determination depends only on the accuracy of the absolute measurement within the segment, while the overall length of the measurable stroke length can be chosen independently with the number of segments.

The sensor device has a plurality of sensors, which are positioned in a line running in axially parallel fashion to the piston rod. If the material measure is divided into segments, then the sensor device has an axial length (i.e., an axial distance between the outermost sensors) that is at least equal to the axial length of the segments. In this way, the sensor device can always ascertain the annular measuring structures that form the current segment, in order to interpolate the position of the piston rod inside of this segment. This also ensures that the position of the annular assigning structure inside the annular measuring structure can be determined.

The sensors may have a design that is known to the prior art. In particular, magnetically resistive sensors, inductive sensors, or eddy-current sensors can be employed. The magnetic field of these sensors is influenced by the annular structures of the piston rod and the latter's axial position relative to the given sensors. The individual sensors of the sensor device accordingly deliver different signals, whose amplitude depends on the changing axial position of the annular structure relative to the sensor. From the relation of the signal amplitudes of the different sensors belonging to the sensor device, the position of the annular structures relative to the sensor device can be determined in an attached evaluating unit. To influence the magnetic field for these sensors using the annular structures of the piston, the piston rod, along with the annular structures, is made of a weakly magnetic material, e.g., of a suitable iron alloy. So that the tube shoved over the piston does not screen the magnetic field, this tube is made of a "magnetically invisible" material, i.e., of a diamagnetic or paramagnetic material. This may be a plastic, for example. To ensure the necessary resistance to wear, a metal material is preferred, which, in particular, can be a non-magnetic steel, e.g., an austenitic steel.

It is also possible to scan the material measure of the piston with a sensor device having ultrasound sensors. In order to make the material measure covered by the mounted tube perceptible to ultrasound, it is necessary that the materials of the piston rod and of the mounted tube have a differing sound-wave resistance, so that the sound waves are reflected from the surface of the piston rod with the annular structure and are measurable through the mounted tube.

BRIEF DESCRIPTION OF THE DRAWINGS

The disclosure is next described in greater detail on the basis of a schematic exemplary embodiment depicted in the drawing. Shown are.

DETAILED DESCRIPTION

Figure 1:
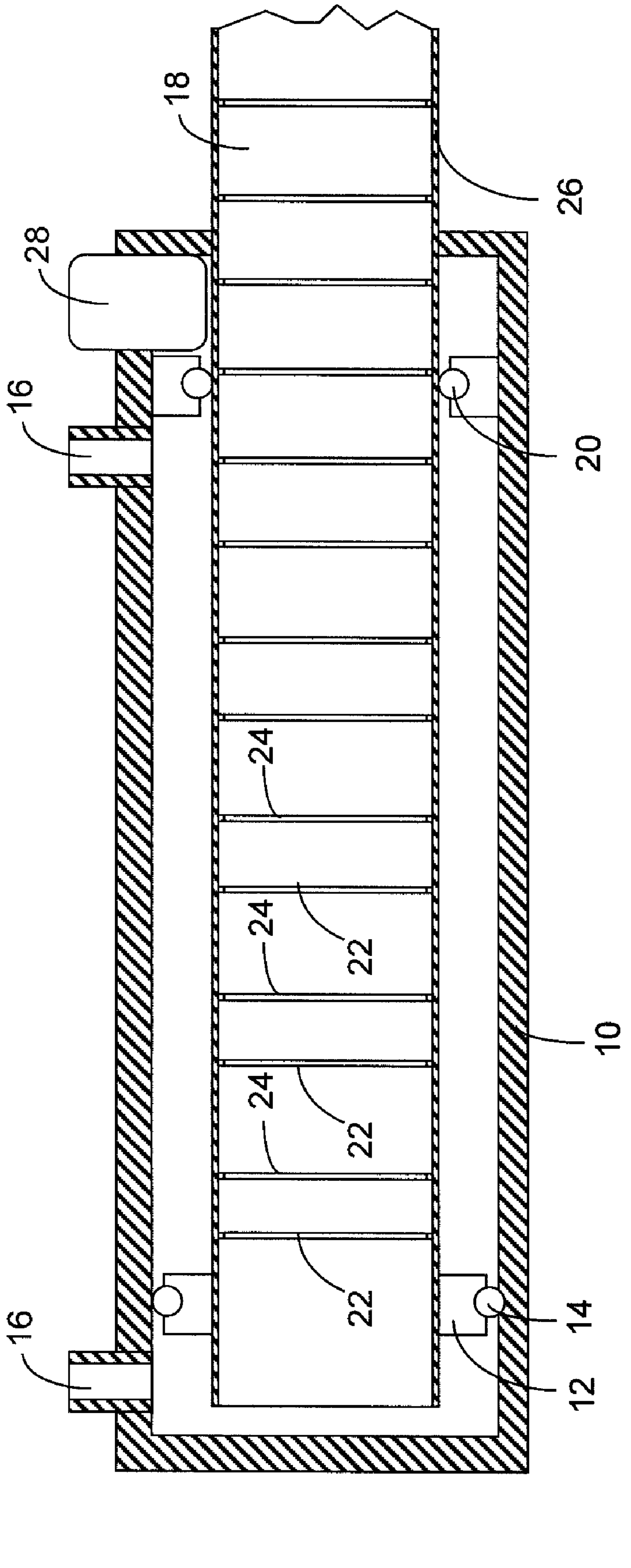
FIG. 1 a cylinder-piston unit schematically depicted in an axial section, with a device for measuring the axial position of the piston rod, and FIG. 2 the absolute coding of the piston rod.

An hydraulic or pneumatic cylinder-piston unit has a cylinder housing 10. In the cylinder chamber of the cylinder housing 10 a piston 12 is mounted in a manner that permits axial movement and is sealed against the cylinder wall with a sealing ring 14. The cylinder chambers on both sides of the piston 12 are fed with liquid pressure over connections 16. The piston 12 is connected to a coaxially positioned piston rod 18, while a sealing ring 20 seals the piston rod 18 on its outer circumference. The cylinder chamber, the piston 12, and the piston rod 18 have a circular, coaxial cross-section, so that the piston rod 12 can turn around its axis.

On its outer circumference, the piston rod 18 is provided with annular structures, which enclose the piston rod 18 in concentric fashion and in the depicted embodiment are formed by grooves 22 and 24, which are cut into the jacket surface by machining. A tube 26 is slid onto the piston rod 18 axially, and this tube 26 rests in radially sealed fashion against the outer circumference of the piston rod 18. The tube 26 thus forms the outer circumferential area of the piston rod 18, against which the sealing ring 20 rests and by means of which the piston rod 18 is guided in axially movable fashion within the cylinder housing 10.

Positioned on that end of the cylinder housing 10 from which the piston rod 18 emerges is a sensor device 28, which borders the outer circumference of the tube 26 from a slight distance and scans the piston rod 18 and its annular structures.

The sensor device 28 consists of several sensors, which are positioned in a line that runs parallel to the axis of the piston rod 18. The sensors belonging to the sensor device 28 can be variously designed in a manner known to the prior art.

The sensors belonging to the sensor device can be magneto-resistive sensors. The magnetic field of these sensors, which lies on an axis parallel to the piston rod 18, depends on the magnetic flux of the sensors, so that there is a high magnetic flux, and thus a large signal amplitude, for the sensors when an area between the recessed grooves 22 and 24 is axially located at the given sensor. The recessed grooves 22 and 24, on the other hand, interrupt the magnetic flux on the surface of the piston rod 18, so that the signal amplitude of the given sensor is reduced when one of the grooves 22 and 24 is axially located in the area of the given sensors. In order to conduct the magnetic field on the surface of piston rod 18, said piston rod 18 consists of a weakly magnetic material, at least in its outer circumferential area. So that the magnetic flux is not screened by the mounted tube 26, the later consists of a "magnetically invisible" material, i.e., of a diamagnetic or paramagnetic material. With respect to abrasion resistance and these magnetic properties, the mounted tube 26 advantageously consists of a non-magnetic, high-grade steel, e.g., an austenitic steel alloy.

In another embodiment the sensors belonging to the sensor device 28 are inductive sensors, which operate according to the principle of a transformer. The alternating magnetic field of these sensors is magnetically short-circuited over the jacket surface of the piston rod 18 between the grooves 22 and 24, so that here also there is a large signal amplitude when one of the piston rod's axial areas between grooves 22 and 24 is located in the position of the given sensor, while the grooves 22 and 24 bring about a reduction of the sensor signal. In this embodiment, too, the piston rod 18 is made of a weakly magnetic material and the tube 26 is made of a magnetically invisible material.

Furthermore, the sensors of the sensor device 28 can be eddy-current sensors, in which case the sensors' alternating magnetic field in the outer jacket layer of the piston rod 18 produce eddy-currents when the axial areas of the piston rod 18 lying between the grooves 22 and 24 are located in the axial position of the specific sensor. The recessed grooves 22 and 24 interrupt the magnetic field and thus interrupt the creation of eddy-currents. In this embodiment the piston rod 18 must have a high degree of electrical conductivity, at least in its outer jacket layer. The mounted tube 26 in this embodiment must also consist of a magnetically invisible material, which does not screen the alternating magnetic field of the sensors.

Finally, the sensors belonging to the sensor device 28 can also be ultrasound sensors. In this embodiment the jacket surface of the piston rod 18 is scanned with ultrasound by the sensor device 28 in order to determine the axial position of the annular structures. In order employ ultrasound sensors to scan the jacket surface of the piston rod 18 that is covered by the mounted tube 26, the material of the mounted tube 26 must have good ultrasound permeability, while the material of the piston rod 18 must be able to reflect the ultrasound.

Figure 2:
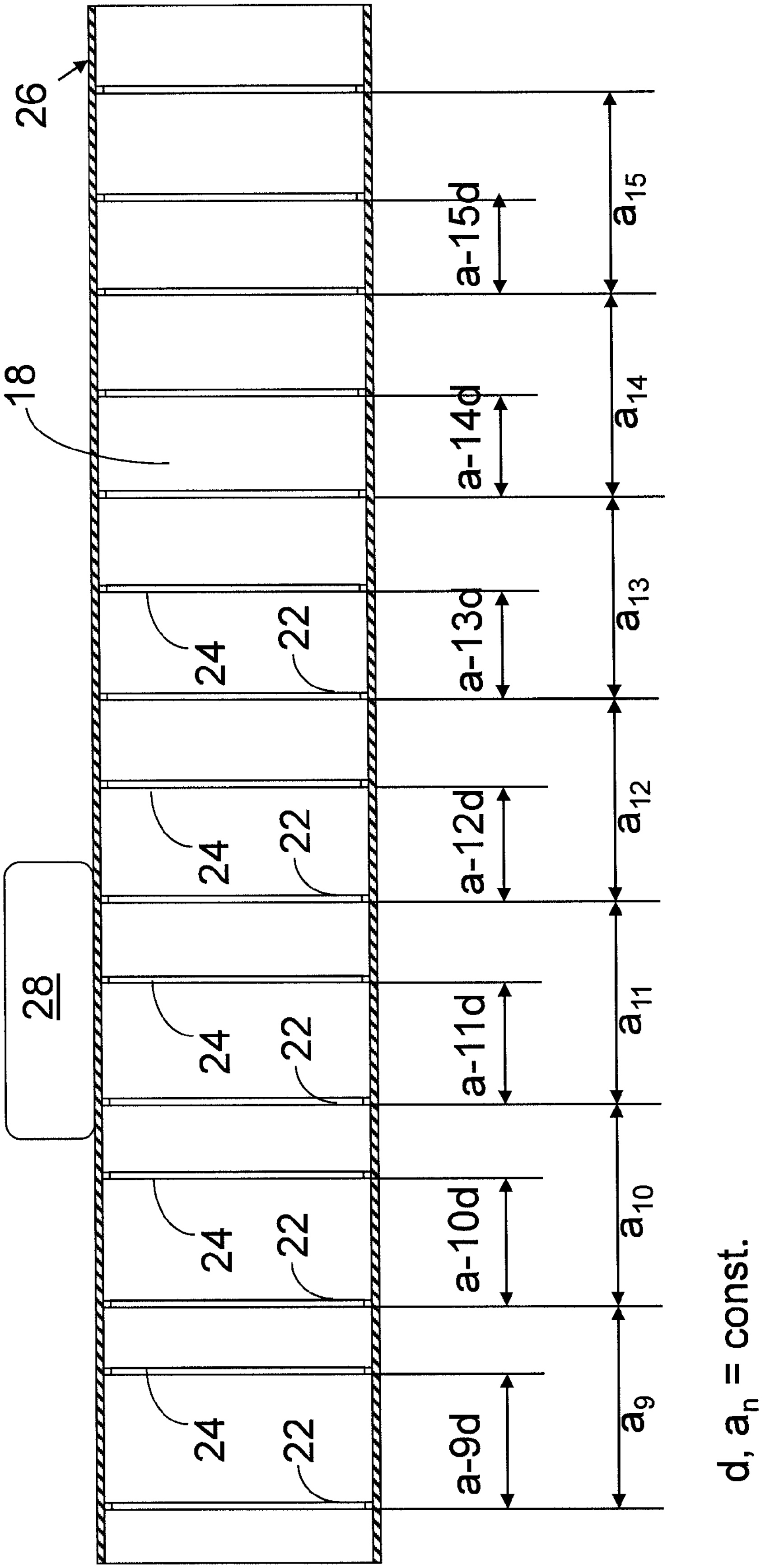

An exemplary embodiment depicted in FIG. 2 shows the coding of the piston rod 18 by the grooves 22 and 24 to determine in absolute fashion the position of the piston rod 18 in relation to the sensor device 28 on the cylinder housing 10.

On its outer circumference the piston rod 18 has annular structures formed by concentrically machined grooves. The grooves 22 are positioned in equidistant fashion over the entire piston rod's axial length of the stroke, which is being measured; and these grooves 22 define annular measuring structures of uniform length a. The annular measuring structures formed by the grooves 22 thus define adjacent, periodic segments $a_1, a_2 \ldots a_n$.

Within each of these segments $a_1, a_2 \ldots a_n$ there is an annular assigning structure formed by a groove 24. The axial position of the annular assigning structure inside of the given segment $a_1, a_2 \ldots a_n$ differs for each segment $a_1, a_2 \ldots a_n$. The given axial position of the annular assigning structure inside the corresponding segment $a_1, a_2 \ldots a_n$ thus provides a clear indicator of the given segment.

In the example shown in FIG. 2, the axial position of the groove 24 shifts within the given segment by an axial distance d from one segment to the next. In FIG. 2 this is shown for one axial section of the piston rod 18. In the $9^{th}$ segment, the groove 24 of the annular assigning structure is axially shifted by a distance of 9d relative to the end of the segment $a_9$ formed by the groove 22. In the following segment $a_{10}$, the groove 24 is shifted by a distance of 10d toward the end of this segment $a_{10}$ formed by the groove 24, etc.

The sensor device 28 ascertains the axial position of the annular measuring structures defined by the grooves 22, and here the axial position of the piston 18 inside of the given segment $a_9$ can be absolutely determined by the sensors of the sensor device 28, which are arranged in a row. The sensor device 28 also determines the axial position of the annular assigning structure, which is formed by the groove 24 and is located inside the given segment $a_n$, so that the absolute position value inside the segment $a_n$ can be clearly assigned to the given segment. In an evaluating unit positioned behind the sensor device, the identification of the segment $a_n$ obtained by means of the annular assigning structure is combined with the absolutely determined position inside of this segment $a_n$ to give an absolute determination of position over the entire length of the piston rod 18.

The constant distance between the grooves 22, and thus the axial length of the segments, is selected in accordance with the resolution required for measuring the axial position and with the design of the sensor unit 28. This axial segment length a can lie, for example, on an order of magnitude of 50 mm.

LIST OF REFERENCE NUMERALS

10 cylinder housing
12 piston
14 sealing ring
16 connections
18 piston rod
20 sealing ring
22 grooves belonging to the annular measuring structures
24 grooves belonging to the annular assigning structures
26 tube
28 sensor device

The invention claimed is:

1. Device for measuring the axial position of a piston rod relative to a cylinder housing belonging to a cylinder-piston unit actuated by liquid pressure, with structures that constitute elevations and depressions formed in the cover surface of the piston rod, which structures form a material measure that runs in the axial direction, with a sensor device that is positioned on the cylinder housing and that employs sensors that are spaced in the axial direction to scan the structure in a contact-free fashion the purpose of position identification, and with an abrasion-proof cover for the purpose of guiding the structure inside the cylinder housing, wherein the structures are annular structures that enclose the piston rod concentrically, the cover is a tube coaxially slid onto the piston rod, and the annular structures form an absolutely coded material measure, and wherein annular measuring structures that are equidistantly positioned in the axial direction of the piston rod divide the material measure into segments that are absolutely scanned and that follow each other in periodic fashion, and an annular assigning structure is positioned within each segment, such that the axial position of the annular assigning structure within one segment is different from the axial position of the annular assigning structure in another segment and serves to clearly identify the given segment.

2. Device according to claim 1, wherein the sensor device has a length in the axial direction that is at least equal to the length of one segment.

3. Device according to claim 2, wherein the sensor device has a plurality of sensors succeeding each other in the axial direction, whose signals depend on their individual distance from the annular structures, the signals are evaluated both by the absolute determination of the position of the piston rod within the segment and by the identification of the position of the annular assigning structure within this segment, and the absolute position of the piston rod is formed from these two values.

4. Device according to claim 1, wherein the annular structures are formed by grooves applied to the cover area of the piston rod.

5. Device according to claim 4, wherein the annular measuring structures are defined by grooves and the annular assigning structures are defined by grooves.

6. Device according to claim 4, wherein the tube rests against the circumference of the piston rod in a radially tight fashion.

7. Device according to claim 1, wherein the piston rod consists of a weakly magnetic material and the tube consists of a magnetically invisible material.

8. Device according to claim 7, wherein the tube consists of a non-magnetic high-grade steel, particularly an austenitic steel.

9. Device according to claim 7, wherein the sensor device has magneto-resistive sensors, inductive sensors, or eddy-current sensors.

10. Device according to claim 1, wherein the sensor device has ultrasound sensors, and the piston rod consists of a material that reflects ultrasound, and the tube consists of a material permeable to ultrasound.

* * * * *